INVENTORS.
Edward S. Bettis
Herbert G. MacPherson
Alfred M. Perry
Orville E. Smith

ATTORNEY.

July 3, 1973 E. S. BETTIS ET AL 3,743,577
SINGLE FLUID MOLTEN SALT NUCLEAR BREEDER REACTOR
Filed June 3, 1968 5 Sheets-Sheet 3

INVENTORS
Edward S. Bettis
Herbert G. MacPherson
Alfred M. Perry
Orville L. Smith
BY

ATTORNEY.

United States Patent Office
3,743,577
Patented July 3, 1973

3,743,577
SINGLE FLUID MOLTEN SALT NUCLEAR BREEDER REACTOR
Edward S. Bettis, Knoxville, Herbert G. MacPherson, Oak Ridge, Alfred M. Perry, Knoxville, and Orville L. Smith, Oak Ridge, Tenn., assignors to the United States of America as represented by the United States Atomic Energy Commission
Filed June 3, 1968, Ser. No. 733,843
Int. Cl. G21c 3/54
U.S. Cl. 176—49
16 Claims

ABSTRACT OF THE DISCLOSURE

A molten-salt-fueled graphite-moderated nuclear breeder reactor characterized by a single salt mixture containing both fissile and fertile material which serves as both fuel and blanket fluid. The reactor is divided into core and blanket regions which are distinguished by the degree of neutron moderation provided therein. The degree of neutron moderation in the core and blanket regions may be varied by varying the volume fraction of salt mixture present in each region, by varying the density of the graphite moderator in each region, or by a combination of the two methods. The composition of the salt mixture and the neutron moderation provided in each region are selected so that neutron absorption by the fissile material predominates in the core and absorption of neutrons by the fertile material predominates in the blanket region.

BACKGROUND OF THE INVENTION

The invention described herein relates generally to nuclear reactors, and more particularly to a molten-salt-fueled breeder reactor characterized by a single salt mixture serving as both fuel and blanket fluid. It was made in the course of, or under, a contract with the U.S. Atomic Energy Commission.

As used in this application the following terminology is defined below:

Core region: That portion of the reactor which is characterized by an infinite multiplication factor which is greater than one and a predominantly thermal neutron spectrum.

Blanket region: The region immediately surrounding the core region which is characterized by an infinite multiplication factor which is less than one and a neutron spectrum which is less thermal than that of the core region.

Fissile material: Material which will undergo fission with neutrons of any energy.

Fertile material: Material which can be converted into fissile material through neutron capture.

Breeder reactor or breeder: A nuclear reactor which produces fissile material from fertile material. Further limited herein to reactors producing more fissile material than they consume.

Molten salt fuels have long been recognized as having advantages which make them attractive for use in breeder reactors. For example, being fluid, such fuels are amenable to continuous processing for the removal of fission products and protactinium. Removal of fission products from the fuel during operation minimizes the loss of neutrons through neutron capture by such fission products, thereby contributing to the neutron economy of the reactor and to a low total fuel inventory. Molten salt fuels also have the advantage of being stable in a radiation environment and possess low vapor pressures. The avoidance of fuel fabrication, ease of processing, and low fissile inventory result in low fuel cycle costs for molten-salt-fueled reactors. Heretofore molten salt breeder reactor designs have been limited to 2-fluid systems wherein one fluid contained fissile material and the second fluid contained fertile material. In such systems the fluid containing fissile material is passed through the core region of the reactor and maintained physically separate from the fluid containing fertile material which is passed through both the core region and the blanket region. The successful operation of such a reactor design necessitates physical separation of the two fluids over the lifetime of the reactor because of the undesirable reactivity effects which would result from mixing of the two fluids, and because of the requirements of the chemical processing procedures used for the two fluids.

In the design of a molten-salt-fueled breeder reactor, it has been found necessary to supplement the moderation provided by the carrier salt with an additional moderator such as graphite. Graphite is considered to be most desirable in this connection because of its good structural and nuclear properties. Thermal and irradiation induced dimensional changes in graphite provide problems, however, in maintaining physical separation of fluids in a 2-fluid system.

It is therefore a general object of this invention to provide a molten-salt-fueled breeder reactor design wherein a single salt mixture may be utilized as both a fuel and blanket fluid so as to obviate the problems associated with physical separation of two different fluids.

SUMMARY OF THE INVENTION

A molten-salt-fueled graphite-moderated breeder reactor is provided wherein a single salt mixture containing both fissile and fertile material serves as both fuel and blanket fluid. The reactor is divided into core and blanket regions which are distinguished by the degree of neutron moderation provided therein. The degree of neutron moderation in the core and blanket regions may be varied by varying the volume fraction of salt mixture present in each region, by varying the density of the graphite moderator in each region, or by a combination of the two methods. The composition of the salt mixture and the neutron moderation provided in each region are selected so that neutron absorption by the fissile material predominates in the core and absorption of neutrons by the fertile material predominates in the blanket region. Sufficient moderation is provided to cause a predominantly thermal neutron spectrum to exist in the core region and a less thermal neutron spectrum to exist in the blanket region. The differing neutron spectrums associated with the two regions cause neutron absorption by the fissile material to predominate in the core and neutron absorption by the fertile material to predominate in the blanket region, even though the composition of the salt mixture in both regions is the same. Such an arrangement obviates the need to physically separate the two fluids as in previous 2-fluid designs.

DESCRIPTION OF THE PREFERRED EMBODIMENTS

Figure 1:
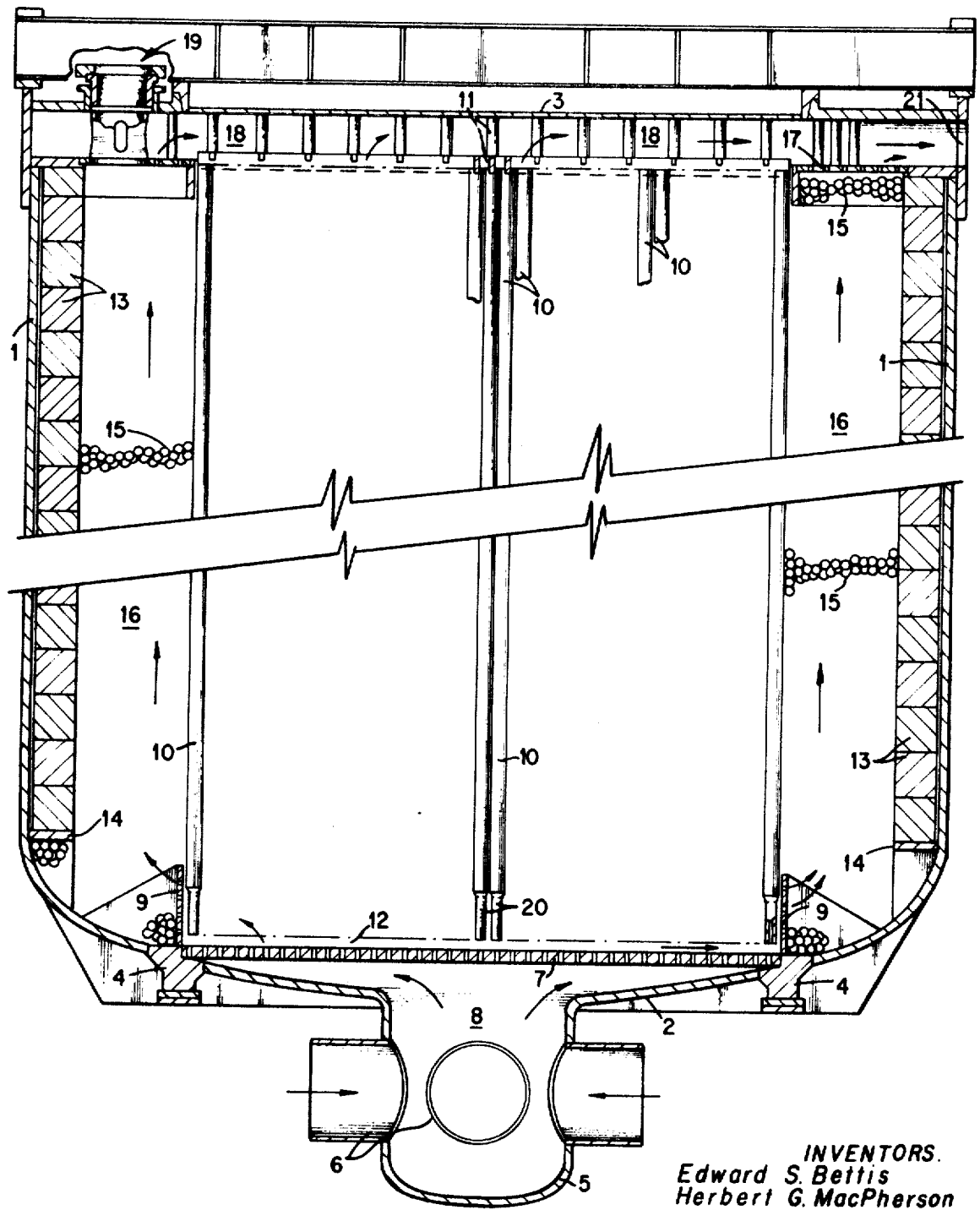
FIG. 1 is an elevation view, in section, of one embodiment of a reactor made in accordance with the invention.
Figure 2:
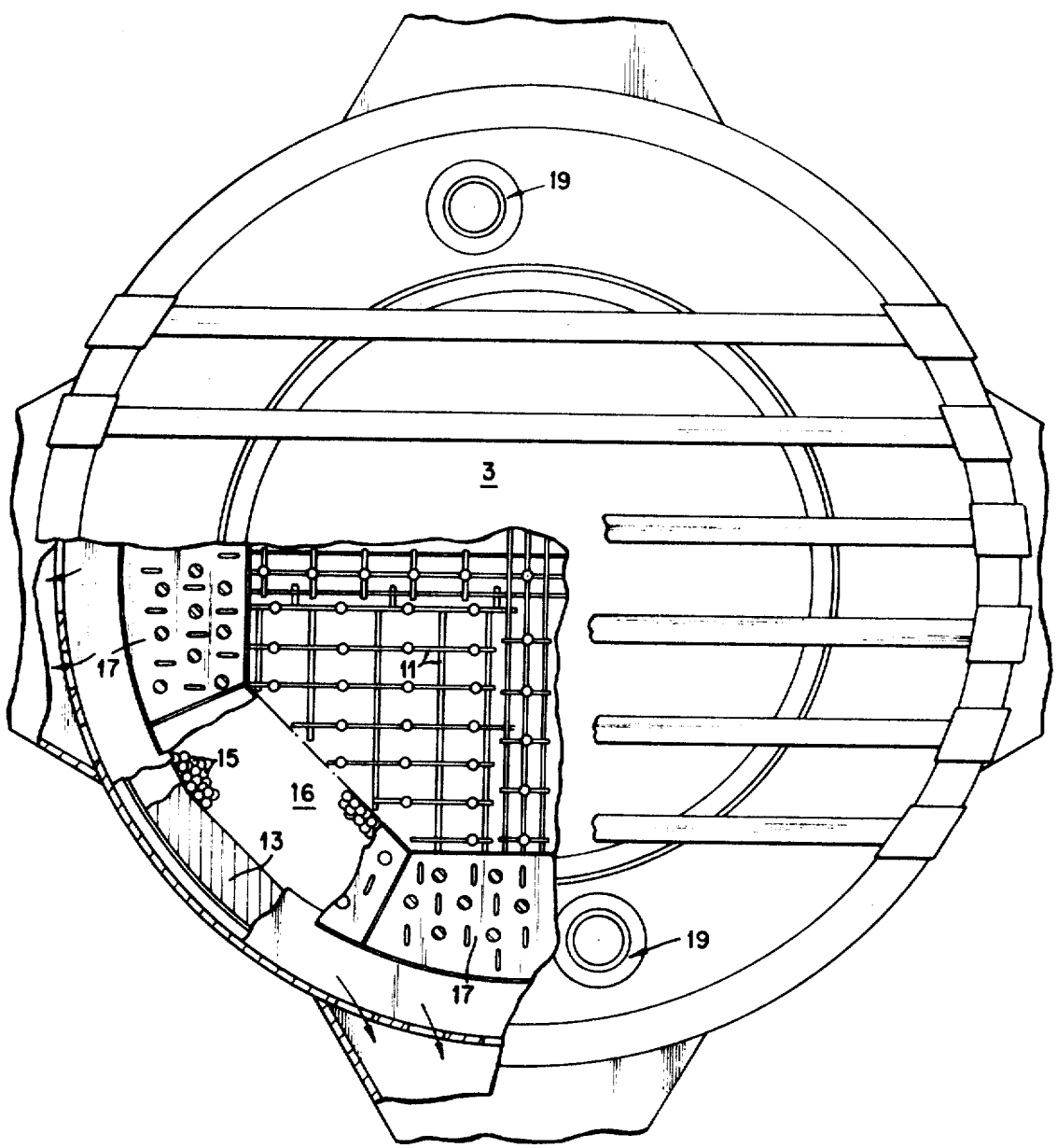
FIG. 2 is a plan view, partly sectioned, of the reactor shown in FIG. 1.

A preferred embodiment of a molten-salt-fueled breeder reactor designed in accordance with the invention is illustrated in FIGS. 1 and 2. The reactor containment vessel comprises a cylindrical body 1 with a dished head 2 closing its lower end and a substantially flat plate-like cover 3 closing its upper end. A massive supporting ring 4 provides a mechanical mounting for the containment vessel and the reactor components disposed therein. From the center of dished head 2 closing the lower end of the containment vessel, an inlet manifold 5 receives molten salt from a heat exchanger (not shown) through return pipes 6.

Inside the reactor vessel, a first grid plate 7, in the form of a flat perforated disk, engages supporting ring 4 along its radial periphery. An inlet plenum 8 is defined by dished head 2 and first grid plate 7 for molten salt returning from the heat exchanger. As shown, an annular, upstanding, perforated retainer plate 9 is disposed above first grid plate 7 where it engages support ring 4. A multiplicity of elongated, vertically oriented graphite core rods 10 are disposed in a generally cylindrical bundle, the lower end of which rests on first grid plate 7 when no molten salt is present within the reactor and which, as shown, is free to move upward away from the grid plate when molten salt is introduced into the reactor. In the presence of the more dense molten salt, graphite rods 10 are buoyed upward against a hold down grid 11 which intersects with the tops of rods 10 in the manner shown in FIGS. 2 and 3. Graphite rods 2 are shorter than the distance between first grid plate 7 and hold down grid 11 so that when rods 10 are buoyed upward against hold down grid 11, the space 12 created between the lower ends of rods 10 and first grid plate 7 serves as a plenum for feeding molten salt upward to the flow channels between and through each rod 10, and outward through perforated retainer plate 9. The flow channels passing through the center of each rod are widened at the top end of the rod to facilitate passage of the salt mixture upward around the grid and to reduce the amount of graphite present at the top ends of the rods.

An annular wall of stacked graphite reflector blocks 13 rests on an annular ledge 14 secured to the reactor containment vessel. Although not needed for neutron conservation purposes because of the relatively low flux levels existing at the wall of the containment vessel, the reflector may still be desirable to protect the structural metal of the containment vessel from the effects of neutron irradiation.

Core rods 10 are supported laterally by a multiplicity of graphite spheres 15 which fill the annular blanket region 16 surrounding the active core region defined by core rods 10. A perforated hold down plate 17 is disposed above blanket region 16 to permit molten salt to discharge from the blanket region into outlet plenum 18 while retaining spheres 15 therein. A sphere insertion and removal hatch 19 is provided for initial insertion of spheres 15 into blanket region 16, as well as their later removal for replacement or to facilitate replacement of core rods 10. The graphite spheres, being buoyant in the dense salt mixture passing through blanket region 16 and restrained from upward movement by perforated hold down plate 17, pack together and exert lateral force against core rods 10 in a wedging action due to their spherical shape. Thus core rods 10 are maintained in a desirable packed condition even after having changed dimensionally due to thermal or irradiation induced graphite growth. Molten salt passes from plenum 12 through perforated retainer plate 9 and upward through the interstices of spheres 15 before discharging from the blanket region through perforated hold down plate 17. Only slight abrasion occurs between graphite spheres 15 since the salt mixture which flows through the interstices moves at a very slow rate. The volume percentage of salt mixture present in blanket region 16 is considerably higher than that of the core region defined by rods 10 in order to provide a less thermal neutron spectrum in the blanket region than exists in the core region. Such less thermal neutron spectrum enhances the absorption of neutrons by fertile material, causing absorption in the fertile material to predominate within the salt mixture in the blanket region, whereas absorption of thermal neutrons by fissile material predominates in the core region. In addition, the enhanced neutron absorption in the fertile material causes the infinite multiplication factor of the blanket region to be less than one so that the neutron flux decreases rapidly with increasing distance from the core boundary, thereby reducing leakage of neutrons from the outer boundary of the blanket region. Thus, even though the same salt mixture is utilized in both regions, the predominant nuclear reaction shifts from one of fission in the core region to breeding in the blanket region. Alternatively, graphite spheres 15 may be made of graphite which is less dense than that of core rods 10 and the same volume fraction of the salt mixture retained, or both the graphite density and salt mixture volume fractions varied to achieve the same less thermal neutron spectrum in the blanket region.

In operation, the molten salt mixture passes from inlet plenum 8 through first grid plate 7 into plenum 12 immediately below the core region. From plenum 12 the major portion of the salt mixture flows upward through and between core rods 10, and a minor portion passes radially outward through perforated retainer plate 9 to blanket region 16. The lower ends 20 of core rods 10 are necked down to facilitate the radially outward flow of a portion of the salt mixture toward retainer plate 9, and to provide an axial blanket region below the active core region which acts in a manner analogous to the radial blanket region 16. After passing upward through the core and blanket regions, the salt mixture discharges into plenum 18 and then out through outlet 21 to a heat exchanger (not shown) before returning to the reactor through return pipes 6. A continuous processing of the salt mixture to remove fission products and protactinium (where thorium is the fertile material) may be provided by removing a portion of the salt from the salt mixture after it leaves the heat exchanger, processing the portion removed, and then returning it to the reactor. Removal of salt for processing may also be made at other points within the reactor system.

Figure 4:
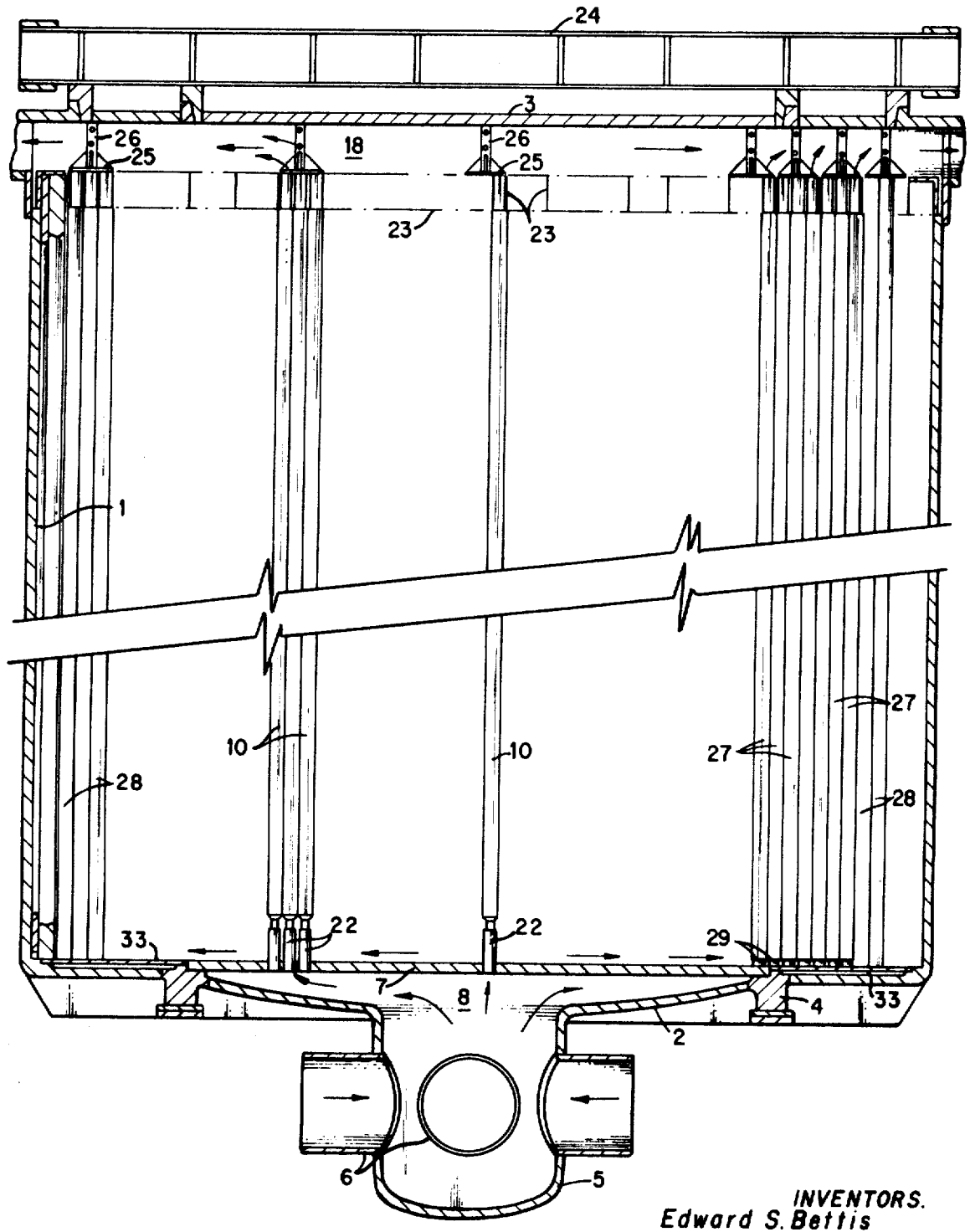
FIG. 4 is an elevation view, in section, of an alternative reactor design.
Figure 5:
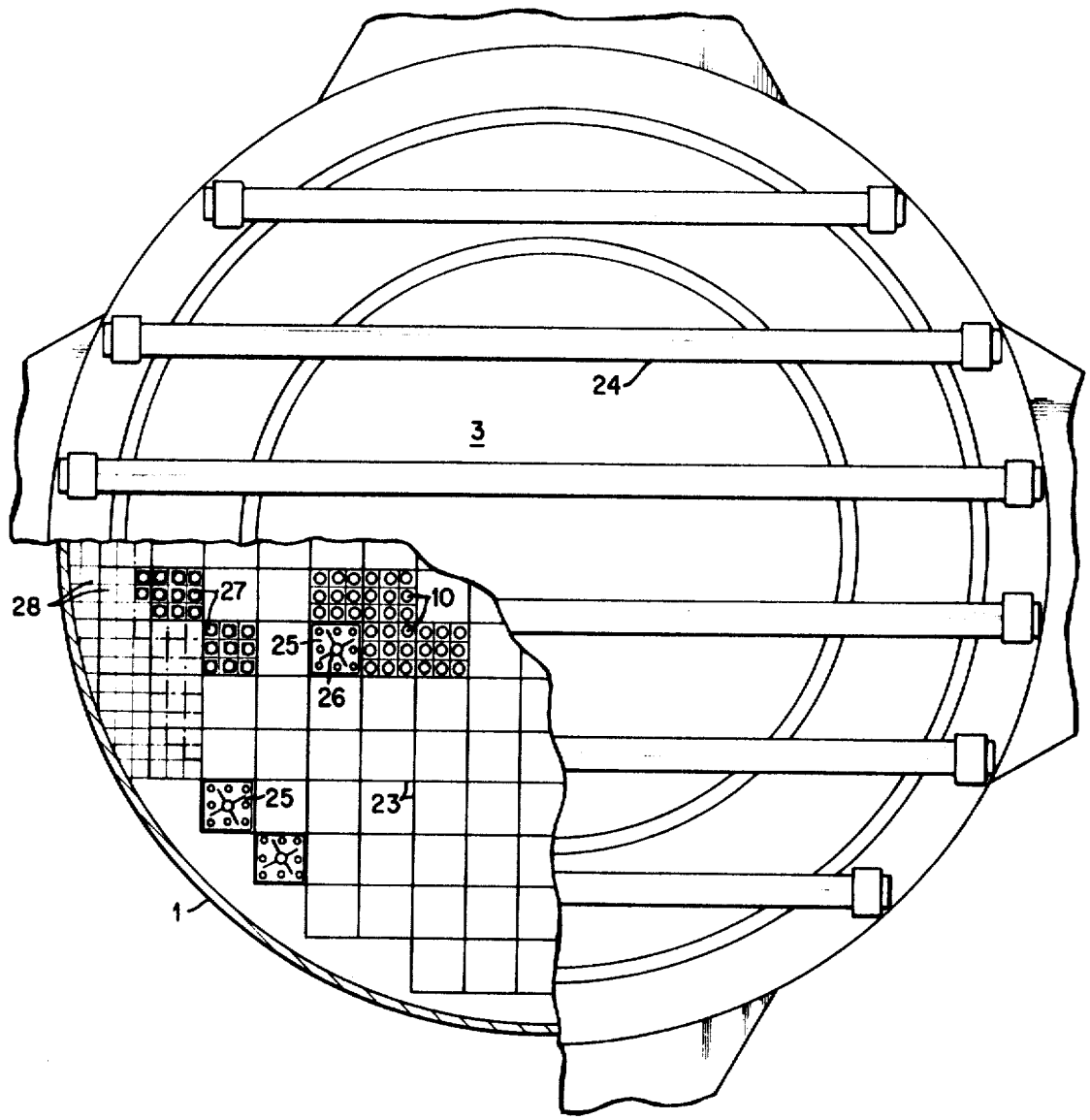
FIG. 5 is a plan view, partly sectioned, of the reactor of FIG. 4.

Referring now to FIGS. 4 and 5, an alternative reactor embodiment is illustrated which differs primarily from that described above in that graphite spheres are no longer used in the blanket region. Because of the similarity of the embodiments, like reference characters are used to designate like or corresponding parts throughout the several views.

Figure 6:
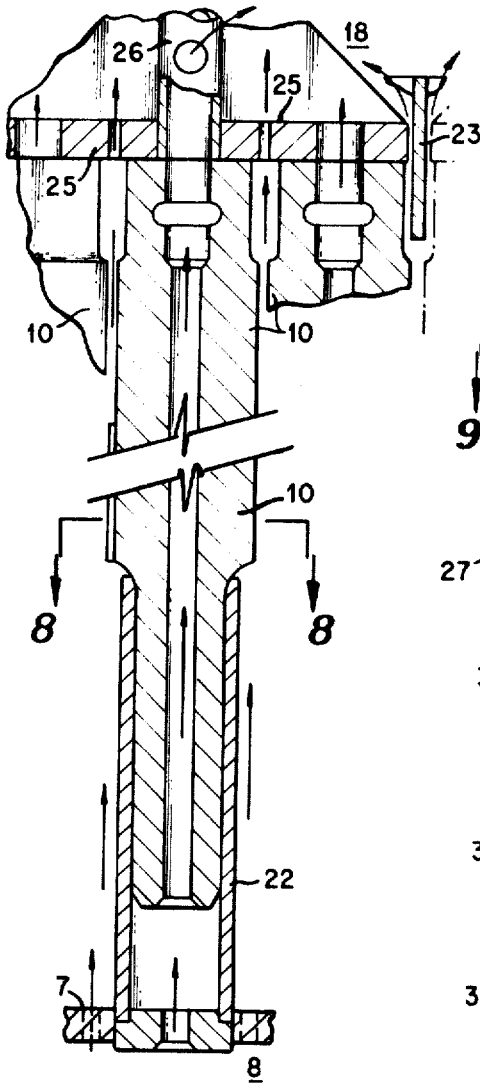
FIG. 6 is a vertical section of a graphite core rod, shown engaging top and bottom grids, used in the core portion of the reactor of FIGS. 4 and 5.
Figure 8:
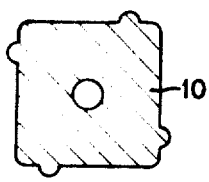
FIG. 8 is a horizontal sectional view of the core rod of FIGS. 3 and 6.

Core rods 10, defining the active core region, are positioned and supported radially by means of upwardly extending sockets 22 which are integrally fixed to grid plate 7 and slidably engage the lower ends 20 of core rods. Core rods 10 and the supporting means used therewith are shown in greater detail in FIGS. 6 and 8 where vertical and horizontal cross sections are shown in a larger scale than that of FIGS. 4 and 5. Core rods 10, being buoyant in the salt mixture, are free to slide upward within sockets 22 when thermal or radiation induced graphite shrinkage occurs therein. The top ends of rods 10 are supported radially within a square grid 23 which is welded to the reactor containment vessel. The squares in the grid are each large enough to contain nine cord rods. Grid 23 locates the top ends of core rods 10 so that each group of nine is exactly positioned within the core. In order for the graphite core rods to fit closely within the grid, the top portion of each rod is reduced in cross section.

With sockets 22 at the bottom and square grid 23 at the top of the core rods 10, the core rods are supported radially but must be provided with additional, downwardly acting axial restraint because of their buoyancy in the salt mixture. In order to provide such axial restraint, the top of the containment vessel is provided with a flat reinforced cover 3 held down with I-beams 24 clamped at the perimeter. In each of the square grid openings above core rods 10, a flat plate 25 provided with a centrally-located upwardly-extending tube 26 transmits the buoyant and pressure force to the reinforced lid of the containment vessel. Blanket rods 27 and a portion of reflector rods 33 are also restrained in this manner. Plate 25 is provided with orifices which register with the flow passageways through core rods 10 and blanket rods 27 to permit the salt mixture to discharge in a controlled manner into discharge plenum 18. Tube 26 is also provided with radial perforations to facilitate flow of the salt mixture from the center core rod within each square array of core rods.

Figure 7:
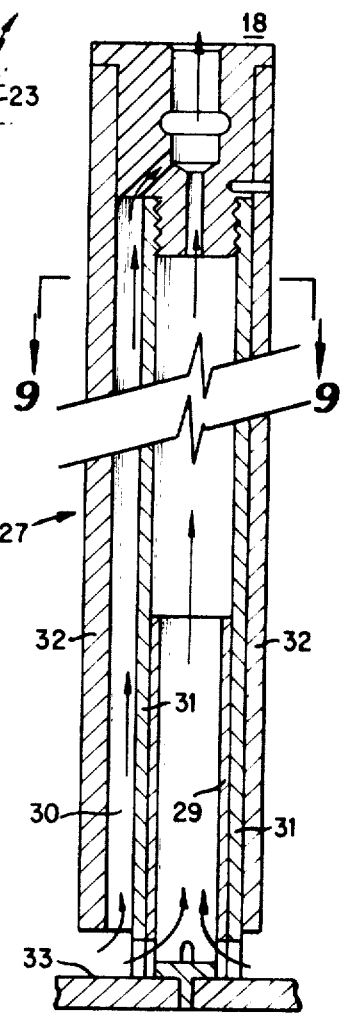
FIG. 7 is a vertical section of a graphite blanket rod, shown engaging top and bottom grids, used in the blanket region of the reactor of FIGS. 4 and 5.
Figure 9:
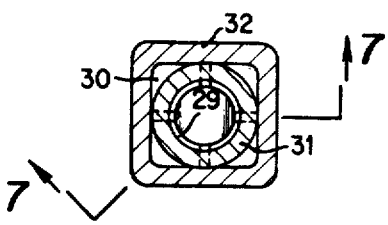
FIG. 9 is a horizontal sectional view of the blanket rod of FIG. 7.

As shown in detail in FIGS. 7 and 9, blanket rods 27 are located radially on grid plate 28 by upwardly extending tubes 29 which slidably engage the inside of the blanket rods and which are fixed at their lower ends to grid plate 28. Such slidable engagement provides a fixed radial position to the blanket rods while permitting them to extend and contract axially. Perforations are provided through the base of each tube 29 to facilitate the flow of the salt mixture into the centers of the blanket rods. As shown by flow arrows, additional salt mixture flows through the passageways 30 between inner cylindrical graphite tube 31 and outer square graphite sleeve 32 disposed about tube 31.

In operation, a first portion of the molten salt mixture passes from inlet plenum 8 through sockets 22 into the center bores of core rods 10. The salt mixture passes upwardly through the core rods and discharges into plenum 18. A second portion of the salt mixture passes through perforations (not shown) in first grid plate 7 intermediate sockets 22 and fills the interstices of sockets 22. A major part of this second portion of the salt mixture flows upward through the spacings provided between core rods 10, and the remaining part flows radially outward between and around sockets 22 to the lower ends of blanket rods 27. Part of the salt reaching the blanket rods passes through perforations in tubes 29 into the interior of graphite tube 31, part passes upward through passageways 30 between graphite tube 31 and square graphite sleeve 32, and a small part passes upward through clearances between the blanket rods. All of the salt mixture passing upward through the blanket and core regions eventually discharges into outlet plenum 18 at the top of the reactor.

Figure 3:
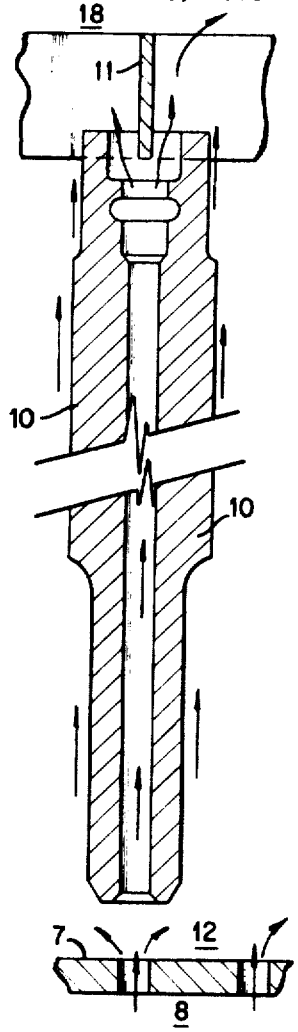
FIG. 3 is a vertical section of a graphite core rod and accompanying top and bottom grids, used in the core of the reactor of FIGS. 1 and 2.

As was the case in the reactor embodiment described in the earlier references to FIGS. 1, 2 and 3, the core and blanket regions of the alternative embodiment of FIGS. 4 and 5 may be characterized by either different salt volume fractions, by equal volume fractions and different graphite densities, or by different salt volume fractions and graphite densities. The blanket region is undermoderated in order to minimize temperature and power peaking and to permit breeding in the blanket region by providing a hardened neutron spectrum in comparison with the core region whereby absorption by the fertile material is enhanced. Variation in the salt volume fraction may also be made within the core region by varying the size of the central bore within core rods 10, providing rod-like inserts within the central bores, and by varying the spacing between adjacent core rods. The increased volume percentage of salt or lower graphite density in the blanket region also depresses the absolute neutron flux in that region, thereby reducing neutron leakage from the reactor. The reduced moderation provided in the blanket region in effect causes that region to be characterized by an infinite multiplication factor less than one because of the larger negative reactivity effect caused by resonance absorption of neutrons in the fertile material present in the salt mixture.

Corrosion resistant base alloys such as those described in U.S. Pat. No. 2,921,850 are suitable for metal components such as grid plate 7, sockets 22, tubes 29, and retainer plate 9. Other reactor components such as ring 4, the reactor containment vessel and all piping which is exposed to the salt mixture may be fabricated from the same material.

Technical specifications for a 2000 Mw(e) single-fluid molten-salt-fueled breeder reactor designed in accordance with the invention substantially as shown in FIGS. 1-3 are listed in the table below.

TABLE

| | |
|---|---|
| Power, Mw (electrical) | 2000 |
| Reactor vessel diameter, ft. | 18 |
| Reactor vessel height, ft. | 25 |
| Active core diameter, ft. | 11.32 |
| Active core height, ft. | 20 |
| Volume fraction of salt mixture in core: | |
|    Central one-third volume | 0.19 |
|    Outer two-thirds volume | 0.17 |
| Thickness of blanket region, ft. | 2.34 |
| Volume fraction of salt mixture in blanket | 0.39 |
| Breeding ratio | 1.068 |
| Fuel yield, percent/yr. | 5.5 |
| Fissile inventory, kg. | 2000 |
| Fertile inventory, kg. | 100,000 |
| Number of core rods | 909 |
| Lateral dimensions of core rods, in. | 4 x 4 |
| Size of graphite spheres in blanket, diam. in. | 1 |
| Salt mixture composition, mole percent: | |
|    LiF | 67.68 |
|    $BeF_2$ | 20.0 |
|    $ThF_4$ | 12.0 |
|    $UF_4$ | 0.32 |
| Salt mixture volume, ft.$^3$: | |
|    Core, blanket and associated inlet and outlet plenums | 1725 |
|    External heat exchangers, piping, processing plant, etc. | 700 |

The above description of two embodiments of the invention was offered for illustrative purposes only, and should not be interpreted in a limiting sense. Various changes may be made in the form, construction and arrangement of the parts described therein without departing from the invention or sacrificing any of its advantages. The salt mixture composition specified in the table may also be varied within limits depending on the specific reactor design without departing from the teachings of the invention. It is intended rather that the invention be limited only by the claims appended hereto.

What is claimed is:

1. A molten-salt-fueled nuclear breeder reactor comprising:
   (a) a centrally-located graphite-moderated active core region characterized by an infinite multiplication factor in excess of one and a predominantly thermal neutron flux;
   (b) a graphite moderated blanket region disposed about said active core region, said blanket region being characterized by a lower degree of neutron moderation than said active core region, an infinite multiplication factor less than one, and a less thermal neutron flux than said active core region;

(c) a single molten salt mixture containing both fissile and fertile material being circulated through said active core and blanket regions, said fissile and fertile materials within said mixture being proportioned so that absorption of thermal neutrons by said fissile material predominates within said active core region, and absorption of neutrons in said fertile material predominates within said blanket region;

(d) inlet means communicating with said active core and blanket regions for supplying said single molten salt mixture thereto; and (e) outlet means communicating with said active core and blanket regions for receiving said single molten salt mixture therefrom.

2. The reactor of claim 1 wherein said blanket region is provided with a greater volume fraction of said single molten salt mixture than said active core region.

3. The reactor of claim 1 wherein said blanket region is provided with a graphite moderator having a lesser density than the graphite moderator of said active core region.

4. The reactor of claim 1 wherein said blanket region is provided with a greater volume fraction of said single molten salt mixture than said active core region, and wherein the graphite moderator in said blanket region has a lesser density than the graphite moderator in said active core region.

5. The reactor of claim 1 wherein said single molten salt mixture comprises a mixture of $LiF$, $BeF_2$, $ThF_4$ and $UF_4$.

6. The reactor of claim 1 wherein said inlet means comprises a common plenum disposed below said active core region.

7. The reactor of claim 1 wherein said outlet means comprises a common plenum disposed above said active core and blanket regions.

8. The reactor of claim 1 wherein said active core region comprises a multiplicity of elongated, vertically oriented graphite core rods disposed in a bundle, said core rods being provided with axial bores and being spaced apart to provide passageways for said single molten salt mixture.

9. The reactor of claim 1 wherein said active core region comprises a multiplicity of elongated, vertically oriented graphite core rods disposed in a bundle, said core rods being provided with axial bores and being spaced apart to provide passageways for said single molten salt mixture, and wherein said blanket region comprises a multiplicity of graphite spheres, said single molten salt mixture being disposed in the interstices of said graphite spheres.

10. The reactor of claim 9 wherein the volume fraction of said single molten salt mixture is greater in said blanket region than in said active core region.

11. The reactor of claim 9 wherein the graphite comprising said graphite spheres is of lesser density than the graphite comprising said graphite core rods.

12. The reactor of claim 1 wherein said active core region comprises a multiplicity of elongated, vertically oriented graphite core rods disposed in a bundle, said core rods being provided with axial bores and being spaced apart to provide passageways for said single molten salt mixture, and wherein said blanket region comprises a multiplicity of elongated, vertically oriented graphite blanket rods, said blanket rods being provided with longitudinal passageways for said single molten salt mixture.

13. The reactor of claim 12 wherein the volume fraction of said single molten salt mixture is greater in said blanket region than in said active core region.

14. The reactor of claim 12 wherein the graphite comprising said graphite blanket rods is of lesser density than the graphite comprising said graphite core rods.

15. The reactor of claim 9 wherein a perforated grid plate is disposed beneath said active core region, and wherein a multiplicity of upwardly extending tubular sockets are integrally fixed to said grid plate in positions which register with the positions of corresponding core rods, said tubular sockets slidably engaging the lower ends of said core rods to position them radially while permitting limited axial movement thereof.

16. The reactor of claim 9 wherein a perforated grid plate is disposed beneath said active core region; wherein a multiplicity of upwardly extending tubular sockets are integrally fixed to said grid plate in positions which register with the positions of corresponding core rods, said tubular sockets slidably engaging the lower ends of said core rods to position them radially while permitting limited axial movement thereof; and wherein a multiplicity of fixed upwardly extending tubes are disposed below said blanket region in positions which register with the positions of corresponding blanket rods, said upwardly extending tubes slidably engaging the lower ends of said blanket rods to position them radially while permitting limited axial movement thereof.

References Cited

UNITED STATES PATENTS

| 3,262,856 | 7/1966 | Bettis | 176—18 |
| 3,403,076 | 9/1968 | Bettis | 176—18 |

BENJAMIN R. PADGETT, Primary Examiner

H. E. BEHREND, Assistant Examiner

U.S. Cl. X.R.

176—18